Patented Oct. 27, 1936

2,058,456

UNITED STATES PATENT OFFICE 2,058,456

METHOD OF EXPELLING THE LIQUID OF CASHEW NUT SHELLS BY HEAT

Edward R. Hughes, Morristown, N. J., assignor to The Harvel Corporation, a corporation of New Jersey No Drawing. Application July 28, 1932, Serial No. 625,542

1 Claim. (Cl. 87—6)

The present invention relates to methods and steps for the extraction of the liquid naturally occurring in the shells of the cashew nut (*Anacardium orrientale*), and the invention also relates to the liquid extracted by the methods of the present invention.

The cashew nut, and also the marking nut, has a shell comprising two walls, one about the other and spaced apart from each other throughout their extent except at one small point where they come together and join. The space between these outer and inner walls is divided off by radial walls to define small cells which contain a liquid which in the cashew nut is generally recognized to be comprised of cardol and anacardic acid. Within the inner shell is the kernel which is highly valued for edible purposes and as a source of oil similar to olive oil and for use generally. About the kernel itself is a paper like covering similar to that found on the peanut or the almond. The outer and inner shells are tough and fairly hard but not brittle and these characteristics together with the cushioning effect of the body of liquid between the two shells make it difficult to crack the shells and remove them from the kernel without breaking the latter. The difficulty in removing this shell is further increased due to the fact that the shell liquid has a vesicant action on the human skin.

The commercial method heretofore used for extracting the shell liquid and for freeing the kernels from the shell has been to char or burn the shells to such an extent that they can be broken apart by hand. This method has among others the disadvantages of the adulteration of the shell liquid with a great deal of carbon from the charred or burned shells and the exposure of the hands of the workmen to the vesicant action of the shell liquid.

I have disclosed a method of extracting liquid from cashew nut shells in my Patent No. 1,784,628, issued December 9, 1930, and in my copending application Serial No. 380,225, filed July 22, 1929 which latter is a division of the application of said patent, and of which this is a continuation-in-part. Patent No. 1,777,808 to Thomas M. Rector issued October 7, 1930 also discloses a method for extracting oil from cashew nut shells. The present invention is intended to provide a method having advantages over methods heretofore used and to provide a cashew nut shell liquid which can be secured uniformly in a high grade and in a condition approximating the natural condition of the oil. For example, when the shells are heated to a point where they begin to darken and even below the actual charring the shell liquid is darkened, whereas by the present method the extent and time of heating can be regulated to secure shell liquid which is not darkened or is darkened to a minimum degree.

An object of the invention is to extract by explosion the liquid from the shell of the cashew nut, or of the marking nut, with the aid of heat to produce a pressure explosion of the shell liquid through the outer shell wall and at the same time to avoid darkening of the outside of the shell which might occur through excessive heating, the darkening of the shell being considered to darken the shell liquid upon contact.

Other objects and advantages of the invention will be apparent from the description of the invention herein given.

According to the present invention I employ an organic liquid for transmitting heat to cashew nuts or shells immersed therein, the organic liquid being selected so that the cashew nut shell liquid expelled by the heat from the shells is not deleteriously affected thereby.

According to one method of the invention cashew nut shell liquid itself is used, the liquid for starting the process preferably being secured by extraction with a solvent such as benzol with subsequent removal of the benzol by evaporation, or by the process disclosed in my said Patent No. 1,784,628 and copending application Serial No. 380,225. With this particular method there is the advantage that there is no necessity for separating the cashew shell liquid of the heat transmitting bath.

According to another form of the invention I use glycerine for the heat transmitting liquid, commercial glycerine of a good grade being suitable. The cashew nut shell liquid is of lower specific gravity than the glycerine and floats to the surface of the latter as it is expelled from the shells. The cashew nut shell liquid is skimmed off the glycerine and complete separation is done by passing through a centrifuge. Cashew nut shell liquid and glycerine will react at about 475° F. but the method of the present invention can be carried on well below the reaction temperature of cashew nut shell liquid and glycerine.

In the practice of the present invention regard is taken of the above mentioned facts that heating for certain time and temperature combinations will darken the shell liquid. For some purposes it is desired to get the shell liquid in as light a color as possible but for others the lightest color is not necessary because subsequent treatment of the shell liquid requires heating and other treatment at temperatures that will darken it. Heating at certain temperatures and for certain times also cooks the kernel and will darken it, excessive heating of course causing excessive cooking and darkening of the kernels. Most roasters demand the kernels in the uncooked or raw state and prefer to roast them themselves. Accordingly the temperatures and the time periods of heating are regulated or controlled to suit the desired needs or desired combinations thereof with respect to quantity of shell liquid expelled, color of the expelled shell liquid, and state of the kernel at the end of the process. For example, such heat treatment will be given as will expel most or practically all of the shell liquid and the browned kernels sold for what they will bring in that state; or the heating can be regulated to secure maximum quantity of expelled shell liquid possible while leaving the kernels in their natural color.

Another advantage of the process of the present invention is that the heating to expel the shell liquid from the shells changes the latter from their natural tough condition to a more brittle condition in which they are more readily removable from the kernels, and this step can be used for changing the shell from the tough to the brittle state without expelling any oil from the shell, the heat treatment being regulated to suit this result.

In the practice of the present invention, with the use of cashew nut shell liquid or other organic liquid for the bath for transmitting heat to the cashew nuts or cashew nut shells for the expulsion of the shell liquid therefrom, heat can be applied to said heat transmitting bath either directly, by means of immersed or surrounding heating coils, or by means of a second or outer bath, a double kettle, jacket or other suitable arrangement being used. And to get uniform distribution of heat the heating coils or double bath are favored. A heavy petroleum or vaseline serve well for the outer bath when such is used. The temperature at which the process is carried out and the length of time during which the nuts or shells are subjected to the process temperature are regulated or controlled to secure best results with regard to darkening of the shell or shell liquid or darkening or cooking of the kernel and with regard to changing the shell from its natural toughness to a more brittle state.

For some purposes the cashew nuts are soaked in water, for example, for six to twenty-four hours and then dried, for example, from six to twenty-four hours or for several days at normal temperature say 68° F., after which they are heated by being immersed in a bath of cashew nut shell liquid or other organic liquid, for example, glycerine. This moisture taken up by soaking helps raise a disrupting pressure on the shell when heated and also helps keep the kernels white, and the nuts can be immersed for a longer time at a given temperature without cooking the kernels or blackening the shells and a greater proportion of the shell liquid expelled.

For removing a high percentage of the liquid from the shells of a practical sized batch of cashew nuts a tempeaure in the neighborhood of 325° F. is practical, with immersion in cashew nut shell liquid or in glycerine or other suitable organic liquid according to the method of the present invention, with a period of immersion of about four to eight minutes. With this treatment practically all of the shell liquid is expelled, the shell is changed from the natural grey color to a yellow or light brown, and at seven or eight minute immersion the kernel has hardly or just about begun to cook. Yields of cashew nut shell liquid of about fifteen per cent of the total weight of the cashew nuts are consistently obtained at a temperature of about 325° F. with immersion for about four or five minutes. A temperature between about 300° F. and 350° F. is a good working range for good shell liquid and good kernels, but I find that the cashew nut shell liquid can be expelled from the shell according to the method of the present invention in a temperature range extending from about 250° F. to about 450° F., the temperature used depending on the requirements in the final products.

The immersing operation can be by hand, or by semi-automatic or by automatic machinery as for example by the machinery illustrated and described in my said Patent No. 1,784,628 and co-pending application Serial No. 380,225. The transmission of heat from a body of cashew nut shell liquid to the cashew nuts can be carried out by flowing a stream of heated cashew nut shell liquid over the cashew nuts. And the methods and steps of the present invention can be carried on under vacuum to increase the pressure difference between the outside of the shell and the cellular spaces of the shell.

The treatment of cashew nuts according to the present invention makes it easier to remove the shell from the kernel and if there is any residual liquid in the shell after treatment according to the present invention such residual liquid can be removed by extraction with a solvent such as gasoline, ether and so on, or by pressing.

The cashew nut shell liquid obtained according to the method of the present invention is much lighter in color than commercial cashew nut shell liquid and is substantially entirely free of any outside material such as dirt, carbon and moisture which are found in the commercial grade. The iodine number is over 270, successive runs having been made with an iodine number of about 275, with cashew nut shell liquid obtained by heating cashew nuts in a vacuum used as the first bath after which the resulting mixture of cashew nut shell liquid was used.

Commercial cashew nut shell liquid can be used as the heating bath to start and this becomes gradually greatly diluted by the purer cashew nut shell liquid as the number of batches increases and extra cashew nut shell liquid is removed from the bath. In such case the effect of the lower grade commercial cashew nut shell liquid becomes negligible.

In the claims the terms cashew nut and cashew nut shell liquid can be considered to mean also marking nut and marking nut shell liquid.

Having thus described my invention what I claim and wish to protect by Letters Patent is—

In a method of expelling the liquid from the shell of the cashew nut with the aid of heat, the steps which comprise bringing the nut in contact with moisture so that the nut absorbs moisture and then applying the heat by means of a body of cashew nut shell liquid in contact with the outside of the cashew nut, the temperature of the nut shell liquid body and the period of immersion being relatively adjusted to effect a discharge of a major portion of the contained shell liquid without scorching the nut shell kernels.

EDWARD R. HUGHES.